J. H. PRINGLE.
SHAFT BRAKE MECHANISM.
APPLICATION FILED JAN. 6, 1913.
1,136,266. Patented Apr. 20, 1915.
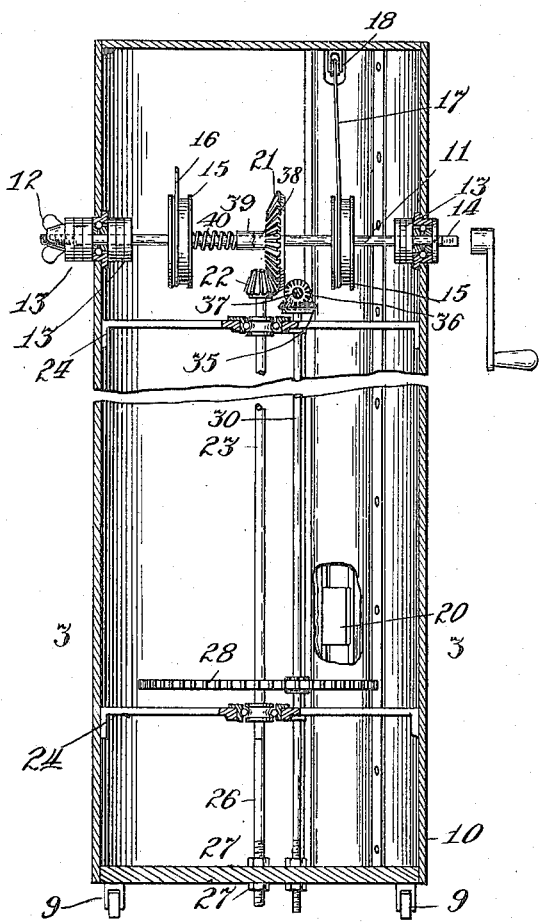

UNITED STATES PATENT OFFICE.

JOHN H. PRINGLE, OF SAC CITY, IOWA.

SHAFT-BRAKE MECHANISM.

1,136,266.

Specification of Letters Patent.

Patented Apr. 20, 1915.

Application filed January 6, 1913. Serial No. 740,340.

*To all whom it may concern:*

Be it known that I, JOHN H. PRINGLE, a citizen of the United States, residing at Sac City, county of Sac, and State of Iowa, have invented certain new and useful Improvements in Shaft-Brake Mechanism, of which the following is a specification.

This invention relates to improvements in shaft brake mechanism, particularly adapted though not necessarily limited in its use with motor shafts, and one of the objects of the same is to provide an improved, simple, durable and cheap mechanism of this character for controlling or regulating the speed of rotation of a shaft, and which mechanism will be effective and efficient in operation.

Other and further objects will appear from the following specification and claims, in connection with the accompanying drawing and in which drawing, the figure is an elevational view of a motor mechanism having an attachment applied thereto, constructed in accordance with the principles of this invention.

With reference to the drawing, the driving mechanism is preferably housed in a cabinet 10 which may be of any suitable form and is here shown as mounted on casters 9. A main driving shaft 11 is suitably mounted across the cabinet at the upper portion, and both of the ends of this shaft 11 protrude through the wall of the housing 10. At one end of the shaft a thumb nut 12 is provided which operates thrust collar bearings 13, 13, at both end portions of the shaft. The other end 14 of the shaft is preferably formed angular in cross section to receive a winding crank. On this shaft 11 are mounted pulleys 15, 15, two being shown, and around which cables or ropes 16, 17 may be wound. They are preferably so arranged that one cable 17 will extend over to one side of the housing and pass over a pulley 18, while the other cable 16 passes over a suitable pulley, (not shown) at the other side of the housing, and at the end of these cables 16, 17 are weights 20, the weight on the cable 17 being only shown.

At about the middle of the shaft 11 is loosely mounted a bevel gear 21, which meshes with a bevel pinion 22, fast on an upright shaft 23, which is journaled to rotate in brackets 24, 24. This shaft is mounted to rotate on a suitable ball bearing secured in the upper end of a pedestal 26, and which latter protrudes through the base of the cabinet and is secured on the inside and outside by nuts 27, 27. At the lower portion of the upright shaft 23 and fixed to rotate therewith is mounted a spur gear 28 of large diameter. This spur gear meshes with a spur pinion on the upright shaft 30, and the latter is journaled in a bracket at its upper end and is mounted to rotate on a suitable ball bearing at its lower end. At the upper end of the shaft 30 is a bevel gear 35, which meshes with a bevel pinion 36 on a stud shaft 37, which latter is journaled in and protrudes through the wall of the cabinet 10 and to which shaft 37 the driven object may be connected.

When the weights are being wound up, to prevent operation of the entire mechanism, a suitable releasing clutch member 38 is provided fast on the bevel gear 21. A second clutch member 39 to engage the clutch member 38, is fastened to one of the pulleys 15 by means of a spring 40. Thus when the shaft 11 is rotated to wind up the weights on the pulleys 15, the bevel gear 21 is at rest, but when the shaft 11 is released to rotate in the opposite direction, the bevel gear 21 will be engaged by means of the members 38, 39, to rotate the shaft 11.

When it is desired to set the device in operation, it is only necessary to apply a winding crank to the receiving end 14, and wind up the weights 20 on the drums 15. When they are wound up tight, and it is desired to retain the device wound up, it is only necessary to turn the thumb nut 12 to lock the shaft 11. Now, when it is desired to operate the mechanism it is only necessary to turn the thumb nut 12 to release the shaft 11. This thumb nut by means of the thrust collar bearings 13 may also be operated to regulate the speed of the shaft. When the weights in their downward movement, rotate the shaft 11, the shaft 37 will also be rotated through the medium of the intermediate mechanism.

Having thus described my invention, what I claim as new and desire to secure by Letters Patent is:

A device of the character described embodying a housing, bearings connected with the housing, a shaft in the bearings, one extremity of the shaft projecting through its bearing and beyond the housing, said projecting end provided with threads thereon, collars connected with the shaft and engaging the inner faces of the bearings, a collar connected with the said projecting end of the shaft and engaging the outer face of the adjacent bearing, and an additional collar engaging the threaded extremity of the shaft and coöperating with the other said collars to create friction between the collars and the respective bearings for regulating the speed of rotation of the shaft.

In witness whereof, I hereunto subscribe my name to this specification in the presence of two witnesses.

JOHN H. PRINGLE.

Witnesses:
A. P. CHAPMAN,
E. J. EAULETH.

Copies of this patent may be obtained for five cents each, by addressing the "Commissioner of Patents, Washington, D. C."